June 18, 1963   H. A. FERGUSON   3,094,013
DUAL-RANGE FORWARD DRIVE WITH RANGE REVERSE
Filed June 2, 1961
FIG. 1
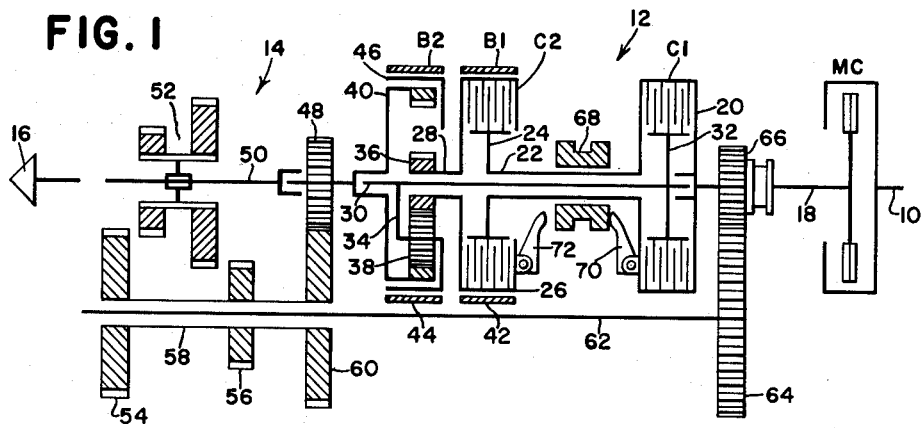
FIG. 2
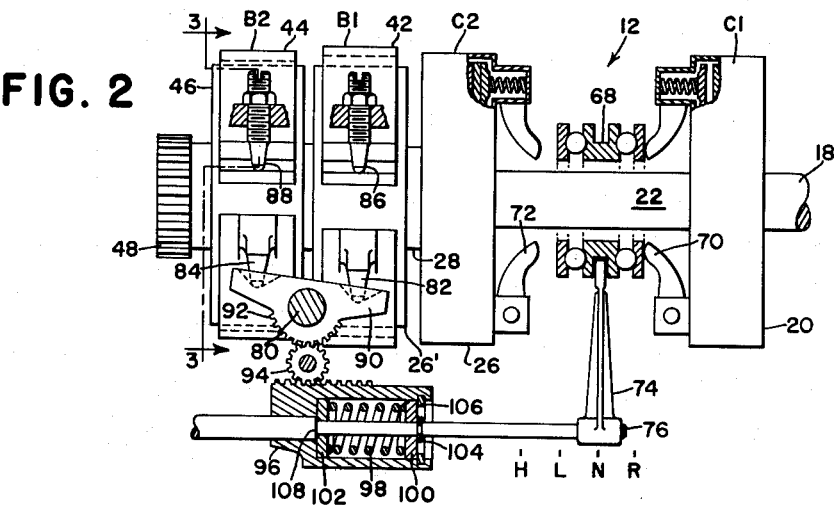
FIG. 3
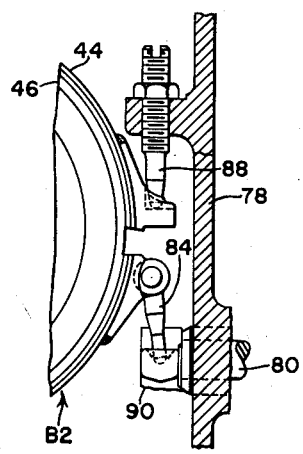
FIG. 4
X=ENGAGED
|   | B2 | B1 | C2 | C1 |
|---|----|----|----|----|
| H |    | X  |    | X  |
| L |    |    | X  | X  |
| N |    |    | X  |    |
| R | X  |    | X  |    |
*INVENTOR.*
H. A. FERGUSON 3,094,013
DUAL-RANGE FORWARD DRIVE WITH
RANGE REVERSE
Henry A. Ferguson, Waterloo, Iowa, assignor to Deere &
Company, Moline, Ill., a corporation of Delaware
Filed June 2, 1961, Ser. No. 124,256
7 Claims. (Cl. 74—740)

This invention relates to a transmission especially adapted for vehicles and has for its principal object the provision of an improved compact transmission of the multirange, multi-speed type.

Transmissions of the general character referred to are known and operate primarily on the principle of providing, for example, a two-speed transmission in series with a selective sliding gear transmission, the two-speed transmission being often termed a range section and the selective sliding gear transmission being known as a speed section. Therefore, the number of speeds in the speed section are doubled by the range section, since the range section will produce either high or low ranges. In most instances, the only reverse speeds that are obtainable are those provided in the selective sliding gear transmission or speed section. According to the present invention, a reversing drive is provided in the range section, in which sense the range section may be referred to as having three speeds, two forward and one reverse. Therefore, this not only doubles the forward speeds in the speed section but also provides a number of reverse speeds equal to one-half the total number of forward speeds.

It is another object of the invention to utilize epicyclic gearing in the range section, thus exploiting the simplicity thereof and the ability of such gearing to lend itself to relatively rapid changes between high and low speeds and between forward and reverse speeds without substantial loss of torque. The epicyclic gearing forming the subject matter of the present invention is unique in the sense that it provides two forward speeds and one reverse speed by the use of two clutches and two brakes, arranged coaxially in compact fashion because of the interjournalling of the input, output and carrier shafts.

It is a further object of the invention to provide improved control means for sequencing the operation of the clutches and brakes. In this respect, it is an object of the invention to provide a relatively simple transmission utilizing direct mechanical connections and thereby providing a drive that has many of the advantages of more expensive and more complicated types.

The foregoing and other important objects and desirable features inherent in and encompassed by the invention will become apparent as a preferred embodiment thereof is disclosed, by way of example, in the ensuing description and accompanying sheet of drawings, the figures of which are described below:

FIG. 1 is a schematic sectional illustration of the drive.

FIG. 2 is an enlarged fragmentary portion of the drive of FIG. 1 and particularly illustrating the controls.

FIG. 3 is an enlarged section on the line 3—3 of FIG. 2.

FIG. 4 is a table illustrating the operation of the range section of the drive.

Since the drive or transmission is especially adapted for use in heavy-duty vehicles such as agricultural and industrial tractors, it will be described in terms of such vehicles; although, the use of such expressions as "front," "rear" etc. should be taken as illustrative and not limiting. That is to say, the conventional vehicle has its power train components disposed fore and aft; although, it is of course known to arrange them otherwise.

In the present instance, the power train is shown as being arranged fore and aft and comprises basically a main power shaft 10 which drives a range section 12 which in turn drives a speed section 14 for ultimate transmission of power to the vehicle final drive, represented here by a bevel pinion 16. Here again, the illustration is not restrictive, since other forms of final drive are known. The main power shaft may be driven by any suitable source of power, such as internal combustion engine (not shown) and the shaft may in turn be selectively connectible to and disconnectible from a coaxial input shaft 18 through the medium of a conventional master clutch, such as that designated at MC.

The input shaft 18 has fixedly secured thereto a clutch drum 20 which in turn has coaxially connected thereto a fore-and-aft hollow drive shaft 22, the front end of which is represented by its connection to the drum 20 and the rear end of which terminates as or is connected to a clutch plate 24 which affords the drive part for a rear clutch C2, the driven part of which is a clutch drum 26 coaxially connected to a sun gear shaft 28 which, like the drive shaft 22, is hollow.

A carrier shaft 30 extends coaxially loosely through the hollow drive shaft 22 and has front and rear ends respectively ahead of and behind the front and rear ends of the drive shaft, the front end having connected thereto a clutch plate 32 which is selectively connectible to and disconnectible from the front clutch drum 20 to establish a front clutch C1, which is located in axially forwardly spaced relation from the rear clutch C2. The rear end of the carrier shaft 30 has connected thereto the carrier element 34 of an epicyclic or planetary gear train, the other elements of which include a sun gear 36, coaxially keyed or otherwise secured to the sun gear shaft 28, one or more planet pinions as at 38, journalled on the carrier 34 and in constant mesh with the sun gear 36, and a coaxial ring gear 40 in constant mesh with the planet pinions 38. In the schematic illustration of the transmission in the drawings, such conventional components as bearings and the like have been omitted, but it will be seen how the several parts are interjournalled.

From the description thus far, and assuming that the master clutch MC is engaged, it will be seen that the front clutch C1 is effective to establish and disestablish drive between the drive shaft 22 and carrier shaft 30 and that the rear clutch is similiarly effective as between the drive shaft 22 and the sun gear 36, thus affording a dual clutch system in which the sun or carrier of the epicyclic gear train may be selectively driven. The addition of brakes B1 and B2 to the system provides for the achievement of two forward speeds and one reverse speed in the range section 12. The brake B1 comprises a band 42 which surrounds and which is selectively engageable with and disengageable from the drum 26 of the rear clutch C2, one of the features here being that the drum 26 doubles as both a clutch part and a brake part. Since the drum 26 is connected to the sun gear 36 via the sun gear shaft 28, the brake B1 is a sun gear brake. The brake B2 comprises a band 44 encircling and selectively engageable with and disengageable from a drum 46 which is coaxially connected with the carrier 34.

In FIG. 1, the band 42 is shown as directly encircling the drum 26. However, in FIG. 2, for the purposes of clarifying the disclosure, the drum 26 is shown as being coaxially connected to a drum 26' which is in turn connected to the sun gear 36. The principle of operation is of course the same; that is to say, the brake B1 is applicable on or disengageable from the sun gear, and the axial separation of the drum 26 and its companion part 26' in FIG. 2 permits clarification of the controls and clutch C2.

It is therefore clear that the brakes B1 and B2 are selectively operative respectively on the sun gear 36 and carrier 34 to produce forward and reverse range drives. When both bands or brakes are released and both clutches C1 and C2 are engaged, the range section 12 is locked up and direct drive is produced. These three range phases are utilized in connection with the speed section 14 to double the number of forward speeds obtainable from the range section and to produce in reverse as many speeds as are obtainable from the speed section.

For this purpose, the ring gear 40 has coaxially connected thereto an output member in the form of a drive gear 48 which provides the input for the speed section 14. The speed section has a shaft 50 coaxially journalled relative to the gear 48 and has splined thereto for axial shifting in opposite directions a gear cluster 52 which is selectively engageable with either of two gears 54 and 56 on a hollow countershaft 58 which parallels the transmission or speed section shaft 50. Keyed or otherwise fixed to the forward end of the hollow countershaft 58 is a gear 60 which is in constant mesh with the gear 48. Hence, the countershaft 58 is constantly driven from the range section, when drive is established through that section, and at least two speeds are produced in the transmission shaft 50, by virtue of selective shifting of the gear cluster 52. It will be understood that other gears could be provided on the countershaft 58 and additional gear clusters provided on the shaft 50, thus affording additional speeds beyond the two indicated by way of illustration.

As an added feature, the power train is provided with a power take-off shaft 62 which extends coaxially loosely through the hollow countershaft 58, and this may be used at the rear of the vehicle for a power take-off. It also could be used at the front of the vehicle for the front power take-off. The forward end of the shaft 62 has a gear 64 keyed thereto which is normally driven from a gear 66 axially shiftably splined on the shaft 18. That is to say, the gear 66 may be shifted selectively into and out of engagement with the gear 64.

Both clutches C1 and C2 are of the type in which engagement is accomplished by spring loading, as will be evident from FIG. 2. Disengagement is achieved by means of an axially shiftable actuator 68 which encircles the shaft 22 axially intermediate the two clutches. The clutches are provided respectively with operating levers 70 and 72 for disengaging them against their spring loads. The actuator 68 is controlled by a shifter fork 74 which is fixed to one end of a control rod 76, and this in turn provides part of control means which coordinates control of the brakes B1 and B2.

As previously stated, the present disclosure illustrates the transmission in the absence of conventional bearings, supports and the like; although, in FIGS. 2 and 3, certain portions of the transmission housing are illustrated by way of a transmission housing wall 78 which carries a transverse rockshaft 80 provided with diametrically oppositely extending arms which are connected respectively by struts 82 and 84 to ends of the bands 42 and 44 for the brakes B1 and B2, respectively. The other end of each brake is anchored to the transmission wall 78, as by an anchor 86 for the brake B1 and an anchor 88 for the brake B2. The arms on the rockshaft 80 are effective to tighten one band while relaxing the other, which is to say that both brakes cannot be applied simultaneously.

The brake control arms are formed on a member 90 which is keyed to the rockshaft 80 and which further has an arcuate pinion portion 92 in constant mesh with a rotatable pinion 94 journaled in any suitable manner on the transmission housing wall 78 on an axis parallel to that of the rockshaft 80. The pinion 94 is also in constant mesh with a rack on a housing 96 that is connected to the control rod 76. The housing has an interior cavity which contains a coil spring 98 confined between front and rear washers 100 and 102, the former of which abuts snap rings 104 and 106 carried by the rod 76 and housing 96 respectively. The other washer 102 abuts the rear radial face of the housing cavity and in addition abuts a shoulder 108 on the rod 76. Thus, the spring is compressible in both directions, depending upon the movement of the rod 76.

In the present case, the arrangement of the positions for the two forward and one reverse-speed range in the range section 12 are arranged in the order of H, L, N and R, which stand respectively for High, Low, Neutral and Reverse. Another neutral could be provided between H and L, or the neutral shown here at N could be omitted.

FIG. 2 shows the transmission in neutral, in which the actuator 68 is shifted forwardly to clear the clutch operating fingers 72 for the clutch C2, thus leaving the clutch C2 engaged under its spring load and at the same time operating the clutch fingers 70 for the front clutch C1 so as to disengage that clutch. The relation of the control rod 76 and housing 96 to the rockable operating member 90 is such that both brakes B1 and B2 are disengaged. In this status, there is no locked or held reaction member and consequently, if the master clutch MC is engaged, any parts that rotate will do so idly. When it is desired to achieve reverse speed in the range section 12, the control rod 76 is moved forwardly from its FIG. 2 position, carrying the actuator 68 forwardly and continuing to disengage the clutch C1 while leaving the clutch C2 engaged. As the rod 76 moves forwardly, the housing 96 is carried therewith through the spring 98, rotating the pinion 94 in a counterclockwise direction and consequently rocking the rockshaft 80 and member 90 in a clockwise direction, while thereby applies force to the strut 84 for the rear brake B2 and thus the brake B2 is engaged. At the same time, the brake B1 remains disengaged. The brake B2 thus restrains the carrier 4 and, since the sun gear 36 is driven because of the engagement of the clutch C2, the sungear 36 will be the input in the planetary and the ring gear will be the output, rotating in a direction reversely as respects the direction of rotation of the driveshaft 22. This will of course drive the countershaft 58 and two speeds in reverse may be achieved depending upon the shifting of the transmission gear cluster 52. As described above, additional gear clusters and countershaft gears could be provided to obtain additional speeds.

Low speed forward in the range section 12 is accomplished by shifting the control rod 76 rearwardly from its FIG. 2 position, the actuator 68 thus moving away from the clutch fingers 70 on the clutch C2 and just approaching but not operating fingers 72 on the clutch C2. This leaves both clutches engaged. At the same time, the housing 96, moving rearwardly, turns the pinion 94 in a clockwise direction which turns the rockshaft 80 in a counterclockwise direction, further relaxing the brake B2 but not applying the brake B1. Therefore both clutches C1 and C2 are engaged, the brakes B1 and B2 are disengaged, and the range section is locked up to provide direct drive. Here again, the gear cluster 52 in the transmission may be shifted back and forth to obtain two speeds in the speed section. Again, it should be noted that additional gear clusters and countershaft gears could be employed to provide a still greater number of speed section ratios.

High range in the range section is accomplished by shifting the control rod further rearwardly, and the actuator 68 thus moves away from the clutch C1, leaving the clutch engaged, while picking up the fingers 72 on the clutch C2 and disengaging that clutch. As the control rod 76 moves rearwardly, carrying the housing 96 therewith, the pinion 94 is turned in a clockwise direction and the rockshaft 80 turns in a counterclockwise direction, applying braking force to the band 42 of the brake B1 through the strut 82 and continuing to relax the brake B2. Therefore, the situation is such that the front clutch C1 is engaged, the rear clutch C2 is disengaged, the front brake B1 is engaged and the rear brake B2 is disengaged. This means that the carrier shaft 30 is the input for the epicyclic or planetary gearing and the ring gear is the output, the sun gear 36 being held and constituting the reaction member. Therefore, forward overdrive is produced in the range section and this in turn can be exploited to achieve as many forward speeds as are provided for in the speed section 14, typical of which are the two speeds available from the gear cluster 52 and the countershaft gears 54 and 56.

The arrangement of the control means is such that the necessary lost motion is available so that proper sequencing of engagement and disengagement is provided for, whereby the brakes and clutches may be picked up and dropped in the proper order. The arrangement of the two clutches C1 and C2 in closely axially spaced apart arrangement enables the use of the single actuator 68 between them. This characteristic of the design further enables the use of the hollow shaft 22, with the carrier shaft 30 extending coaxially loosely therethrough so that the input to the planetary may be selectively to the sun or to the carrier, thereby enabling the achievement of reverse or forward overdrive, the ring gear 40 in all cases being the output. It will be recognized, of course, that the output could be the sun gear and the ring gear could be the reaction member and reverse range would still be accomplished. However, the reduction in that case would be somewhat higher than that obtained when the ring gear is the output and the sun gear is the input.

The compact arrangement of the transmission and the coordination therewith of the control means for the two clutches and the two brakes affords an improved and economical design capable of achieving many of the advantages of more complicated and expensive transmissions. Other features not categorically enumerated will readily occur to those versed in the art, as will many modifications and alterations in the embodiment disclosed, all of which may be achieved without departure from the spirit and scope of the invention.

What is claimed is:

1. High-low-reverse drive mechansim, comprising: a hollow fore-and-aft drive shaft having front and rear ends; a carrier shaft extending coaxially loosely through the drive shaft and having front and rear ends respectively ahead of and behind the front and rear ends of said drive shaft; a coaxial front clutch selectively engageable and disengageable between said front ends of the shafts; epicyclic gearing at the rear ends of said shafts, including a carrier fixed to the rear end of the carrier shaft and journaling a planet pinion, a sun gear coaxial with the shafts and meshing with the pinion, and a coaxial ring gear meshing with the pinion; an output member connected to one of the gears; a rear clutch coaxially spaced behind the front clutch and including a drive part fixed to the rear end of the drive shaft and a driven part fixed to the other gear and selectively engageable and disengageable to connect and disconnect said parts; a front brake behind the front clutch and selectively engageable with and disengageable from the driven part; a rear brake behind the front brake and selectively engageable with and disengageable from the carrier; and control means operatively connected to the clutches and brakes for controlling same in three engaged combinations of front clutch and front brake, both clutches, and rear clutch and rear brake.

2. The invention defined in claim 1 in which: the front clutch includes operating means facing rearwardly; the rear clutch includes operating means facing forwardly in axially spaced relation to the front clutch operating means; and the control means includes an actuator coaxially encircling the drive shaft intermediate the clutches and axially shiftable selectively in one direction to effect engagement of the front clutch while effecting disengagement of the rear clutch and in the opposite direction to effect disengagement of said front clutch while effecting engagement of the rear clutch, said actuator having an intermediate status effecting engagement of both clutches.

3. The invention defined in claim 2, in which: the control means includes a shiftable element connected to the actuator and having an intermediate position corresponding to the intermediate position of said actuator, said element being shiftable with the actuator selectively in opposite directions from its said intermediate position; front and rear operators; and means connecting said operators to the element and operative in said intermediate position of the element to effect disengagement of both brakes and further operative, when said element is shifted to engage the front or rear clutches, to respectively engage the front or rear brakes.

4. High-low-reverse drive mechanism, comprising: a hollow fore-and-aft drive shaft having front and rear ends; a carrier shaft extending coaxially loosely through the drive shaft and having front and rear ends respectively ahead of and behind the front and rear ends of said drive shaft; a coaxial front clutch including a drive part fixed to the drive shaft front end and a driven part fixed to the carrier shaft front end; a coaxial input shaft connected to the front end of the drive shaft; epicyclic gearing at the rear ends of said drive and carrier shafts, including a carrier fixed to the rear end of the carrier shaft and journaling a planet pinion, a sun gear coaxial with the shafts and meshing with the pinion, and a coaxial ring gear meshing with the pinion; an output member connected to one of the gears; a rear clutch coaxially spaced behind the front clutch and including a drive part fixed to the rear end of the drive shaft and a driven part fixed to the other gear and selectively engageable and disengageable to connect and disconnect said rear clutch parts; a front brake behind the front clutch and selectively engageable with and disengageable from the driven part; a rear brake behind the front brake and selectively engageable with and disengageable from the carrier; and control means operatively connected to the clutches and brakes for controlling same in three engaged combinations of front clutch and front brake, both clutches, and rear clutch and rear brake.

5. The invention defined in claim 4, including: a main power shaft coaxially ahead of the input shaft; a main clutch selectively connectible and disconnectible between said input and main power shafts; a power take-off shaft; and means behind the main clutch and drivingly interconnecting the input and power take-off shafts.

6. High-low-reverse drive mechanism, comprising: a hollow fore-and-after drive shaft having front and rear ends; a carrier shaft extending coaxially loosely through the drive shaft and having front and rear ends respectively ahead of and behind the front and rear ends of said drive shaft; a coaxial front clutch selectively engageable and disengageable between said front ends of the shafts; epicyclic gearing at the rear ends of said shafts, including a carrier fixed to the rear end of the carrier shaft and journaling a planet pinion, a sun gear coaxial with the shafts and meshing with the pinion, and a coaxial ring gear meshing with the pinion; an output member connected to the ring gear; a rear clutch coaxially spaced behind the front clutch and selectively engageable between the rear end of the drive shaft and the sun gear; a front brake behind the front clutch and selectively engageable with and disengageable from the sun gear part; a rear brake behind the front brake and selectively engageable with and disengageable from the carrier; and control means operatively connected to the clutches and brakes for controlling same in three engaged combinations of front clutch and front brake, both clutches, and rear clutch and rear brake.

7. The invention defined in claim 1, including: driven means connected to and driven by the output member, and including a pair of shafts having speed-change gearing therebetween, one of said shafts being hollow and radially offset from and parallel to the axis of said output member; a power shaft extending coaxially loosely through the hollow shaft and having a front end proximate to the drive shaft front end; and drive means between said drive shaft front end and said power shaft front end.

References Cited in the file of this patent

UNITED STATES PATENTS

| | | |
|---|---|---|
| 2,813,437 | Kelbel et al. | Nov. 19, 1957 |
| 2,821,869 | Kelbel | Feb. 4, 1958 |
| 2,890,603 | Harris et al. | June 16, 1959 |